US006384976B1

United States Patent
(12) Ishijima et al.

(10) Patent No.: US 6,384,976 B1

(45) Date of Patent: May 7, 2002

(54) IMAGE STABILIZING APPARATUS

(75) Inventors: Toshihisa Ishijima; Kouichi Nagata; Kenichi Takahashi, all of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/670,087

(22) Filed: Sep. 26, 2000

(30) Foreign Application Priority Data

Sep. 28, 1999 (JP) ........................................ 11-275168
Sep. 29, 1999 (JP) ........................................ 11-275610

(51) Int. Cl.[7] ........................................ G02B 27/64

(52) U.S. Cl. ..................... 359/557; 359/407; 359/554; 396/52; 396/55

(58) Field of Search ..................... 359/399, 407–410, 359/554–557; 396/52–55; 348/208

(56) References Cited

U.S. PATENT DOCUMENTS

| | | | | |
|---|---|---|---|---|
| 5,539,575 A | * | 7/1996 | Kakizawa et al. | 359/554 |
| 5,910,859 A | * | 6/1999 | Takahashi et al. | 359/554 |
| 5,978,137 A | | 11/1999 | Takahashi et al. | 359/557 |

FOREIGN PATENT DOCUMENTS

| | | |
|---|---|---|
| EP | 834761 | 4/1998 |
| JP | 57-37852 | 8/1982 |
| JP | 6-250100 | 9/1994 |
| JP | 10-104681 | 4/1998 |

OTHER PUBLICATIONS

English Abstract of the Japanese reference No. 6–250,100.
English Abstract of the Japanese reference No. 57–37,852.

* cited by examiner

*Primary Examiner*—Thong Nguyen
(74) *Attorney, Agent, or Firm*—Ronald R. Snider; Snider & Associates

(57) ABSTRACT

In an image stabilizing apparatus in which an actuator for a pivoting gimbal suspension is controlled by a feedback loop, the gain of feedback loop based on the angular position is enhanced when the angular velocity is at a first set value or higher until the angular velocity becomes a second set value or lower, whereby a panning mode is automatically attained when a pan/tilt operation is carried out. Also the gain of feedback loop based on the angular position is enhanced when the angular velocity is enhanced until a lapse of a predetermined time after starting the pivoting control of the gimbal suspension, whereby the behavior of gimbal suspension is stabilized.

4 Claims, 14 Drawing Sheets

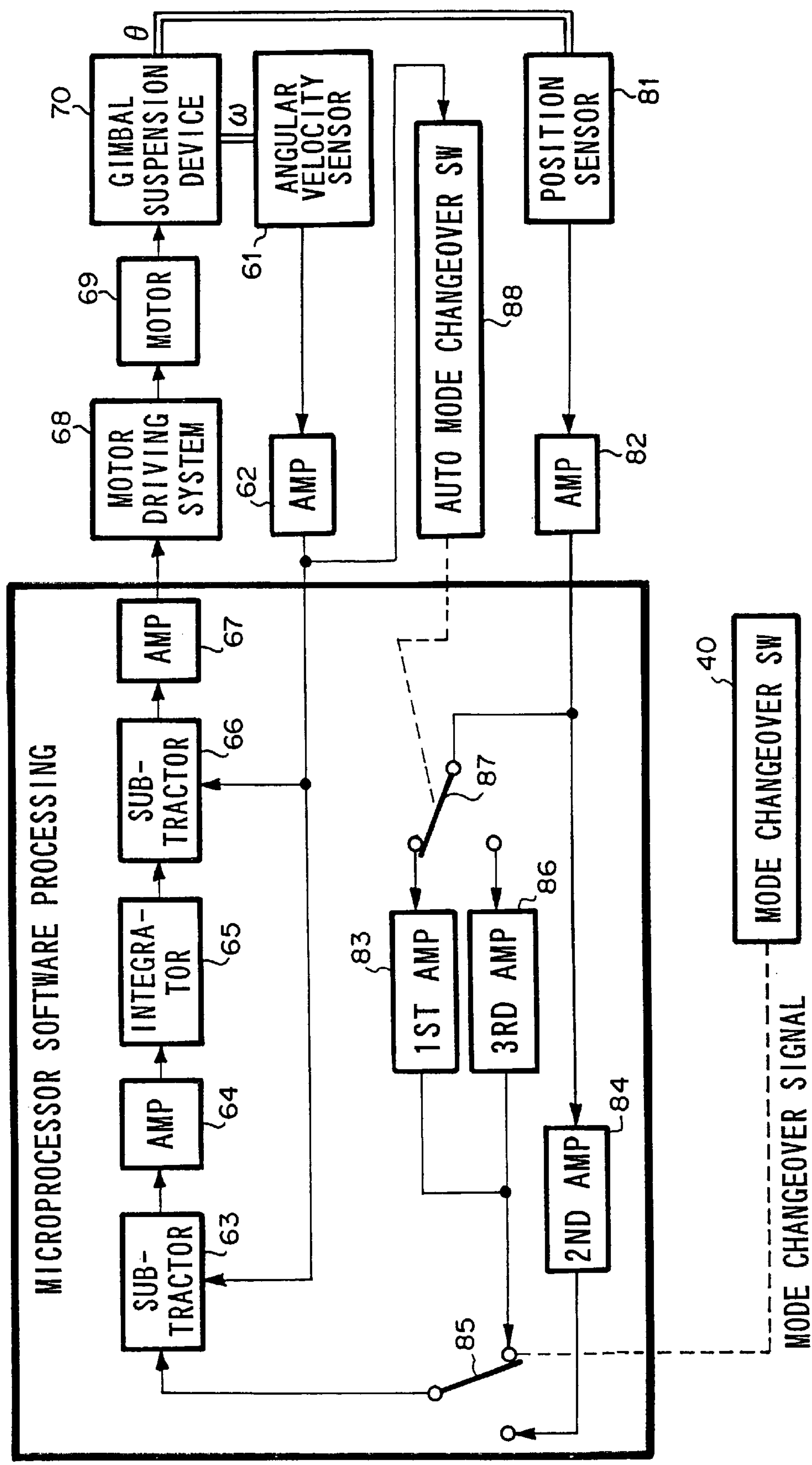
F I G. 1
MICROPROCESSOR SOFTWARE PROCESSING
SUB-TRACTOR
63
AMP
64
INTEGRA-TOR
65
SUB-TRACTOR
66
AMP
67
MOTOR DRIVING SYSTEM
68
MOTOR
69
GIMBAL SUSPENSION DEVICE
70
θ
ω
ANGULAR VELOCITY SENSOR
61
AMP
62
AUTO MODE CHANGEOVER SW
88
POSITION SENSOR
81
AMP
82
87
1ST AMP
83
3RD AMP
86
2ND AMP
84
85
MODE CHANGEOVER SW
40
MODE CHANGEOVER SIGNAL

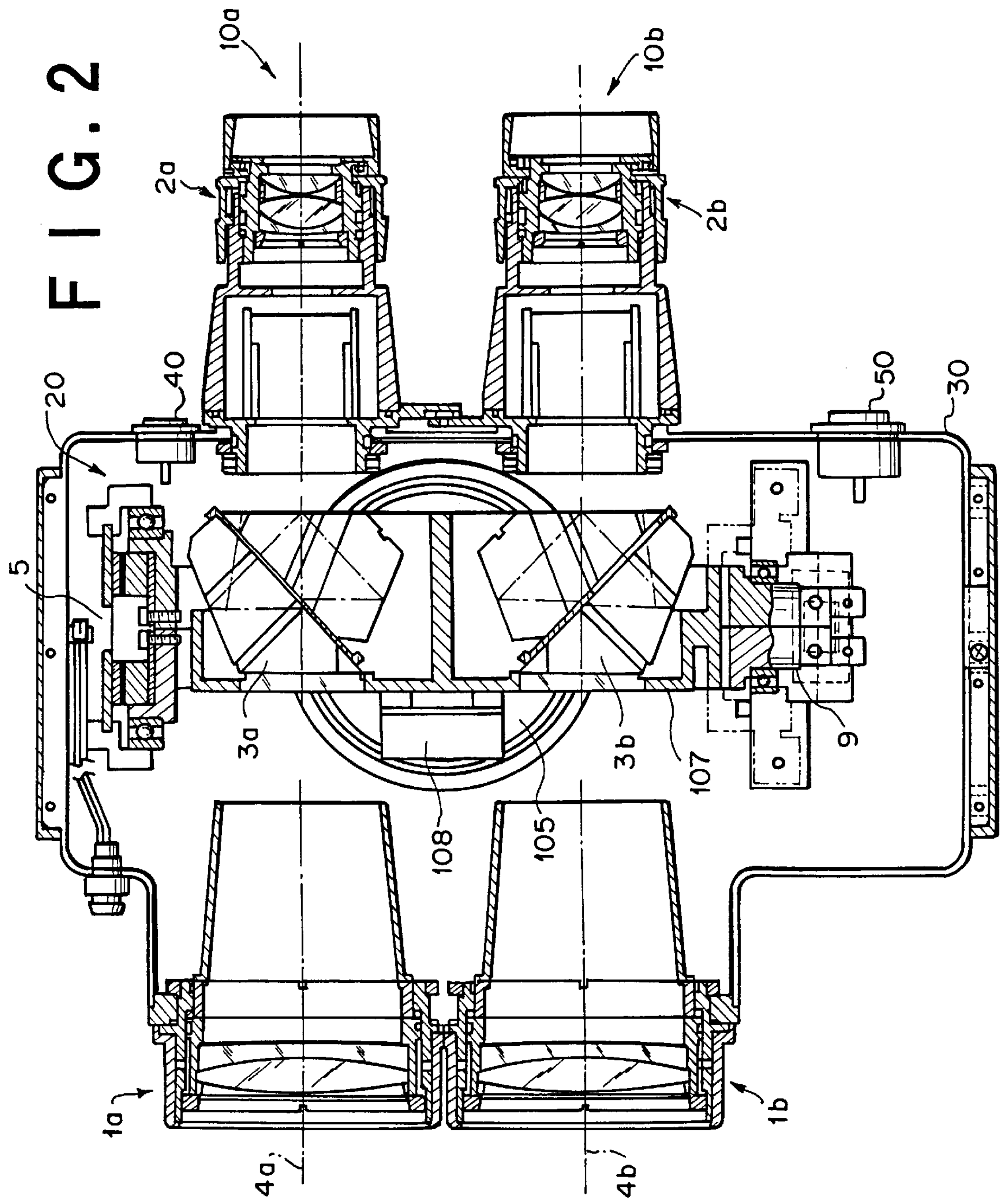
F I G. 2
10a
10b
2a
2b
20
40
50
30
5
3a
3b
107
9
108
105
1a
1b
4a
4b 30
9
107
3b
1b
7
105
20
109
1a
3a
5

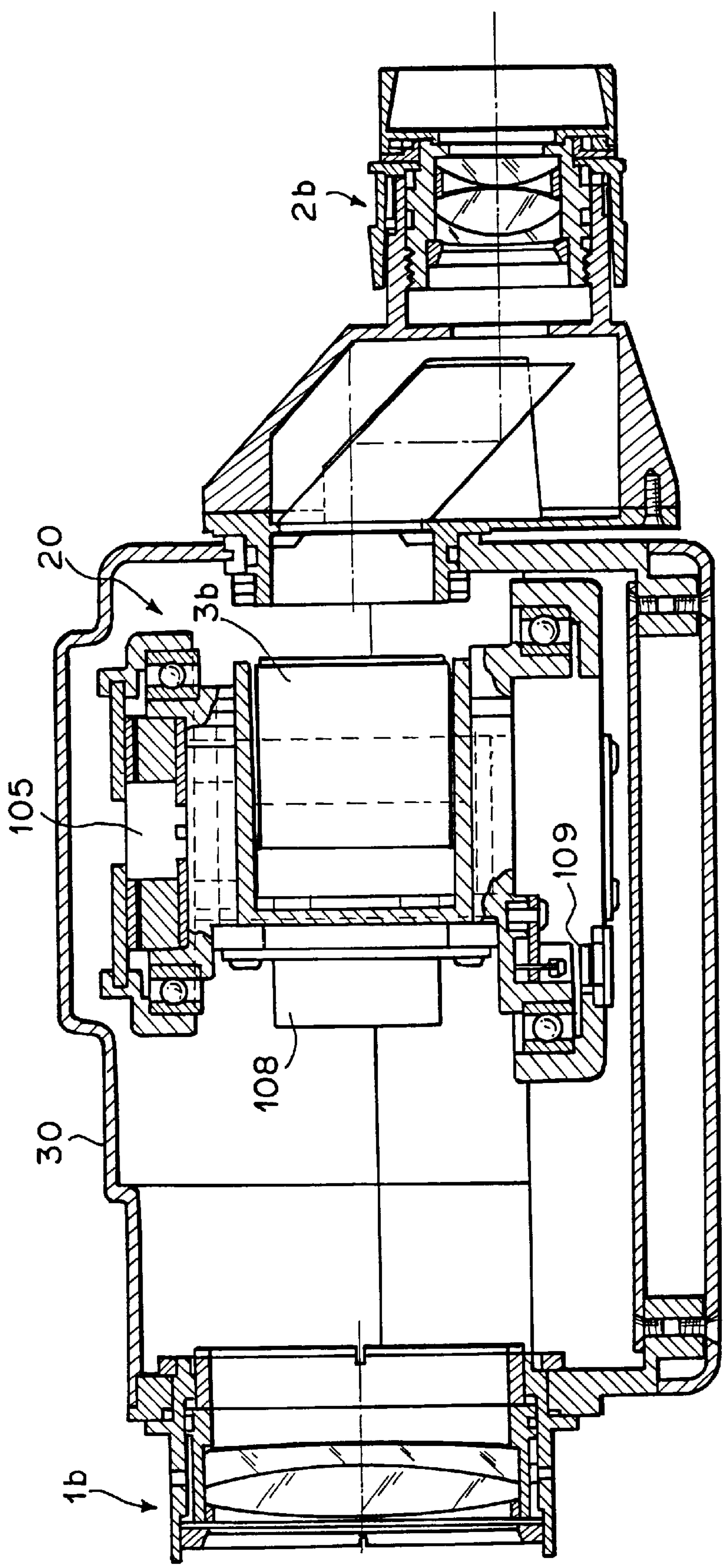
F I G. 4
2b
20
3b
105
109
108
30
1b

ANTI-VIBRATION MODE
PANNING MODE
ANTI-VIBRATION MODE
PANNING MODE
ANTI-VIBRATION MODE
$V_G$
T1
T2
T2
T1

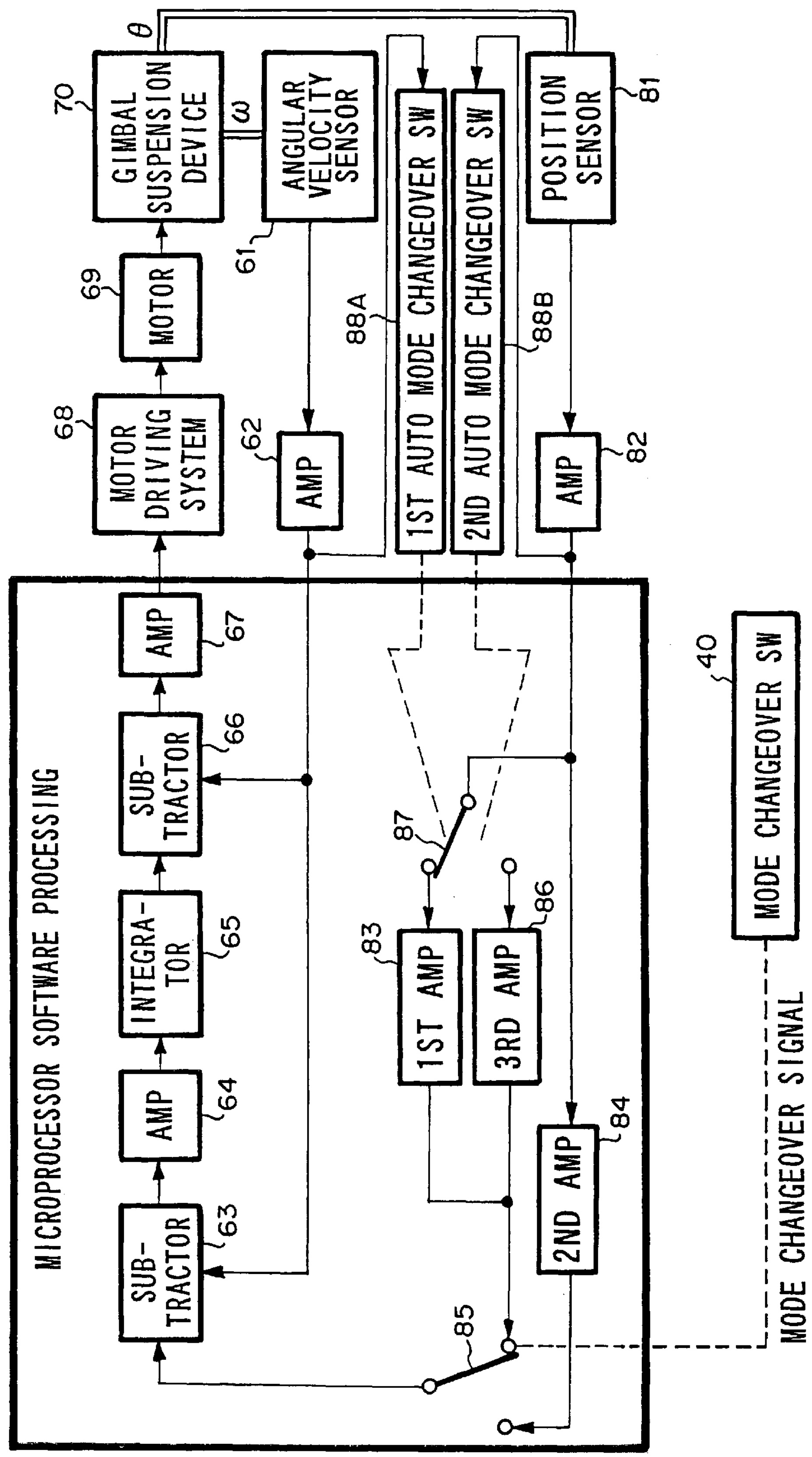
F I G. 11
MICROPROCESSOR SOFTWARE PROCESSING
SUB-TRACTOR
63
AMP
64
INTEGRA-TOR
65
SUB-TRACTOR
66
AMP
67
MOTOR DRIVING SYSTEM
68
MOTOR
69
GIMBAL SUSPENSION DEVICE
70
θ
ω
ANGULAR VELOCITY SENSOR
61
AMP
62
1ST AUTO MODE CHANGEOVER SW
88A
2ND AUTO MODE CHANGEOVER SW
88B
POSITION SENSOR
81
AMP
82
87
1ST AMP
83
3RD AMP
86
2ND AMP
84
85
MODE CHANGEOVER SW
40
MODE CHANGEOVER SIGNAL F I G. 12
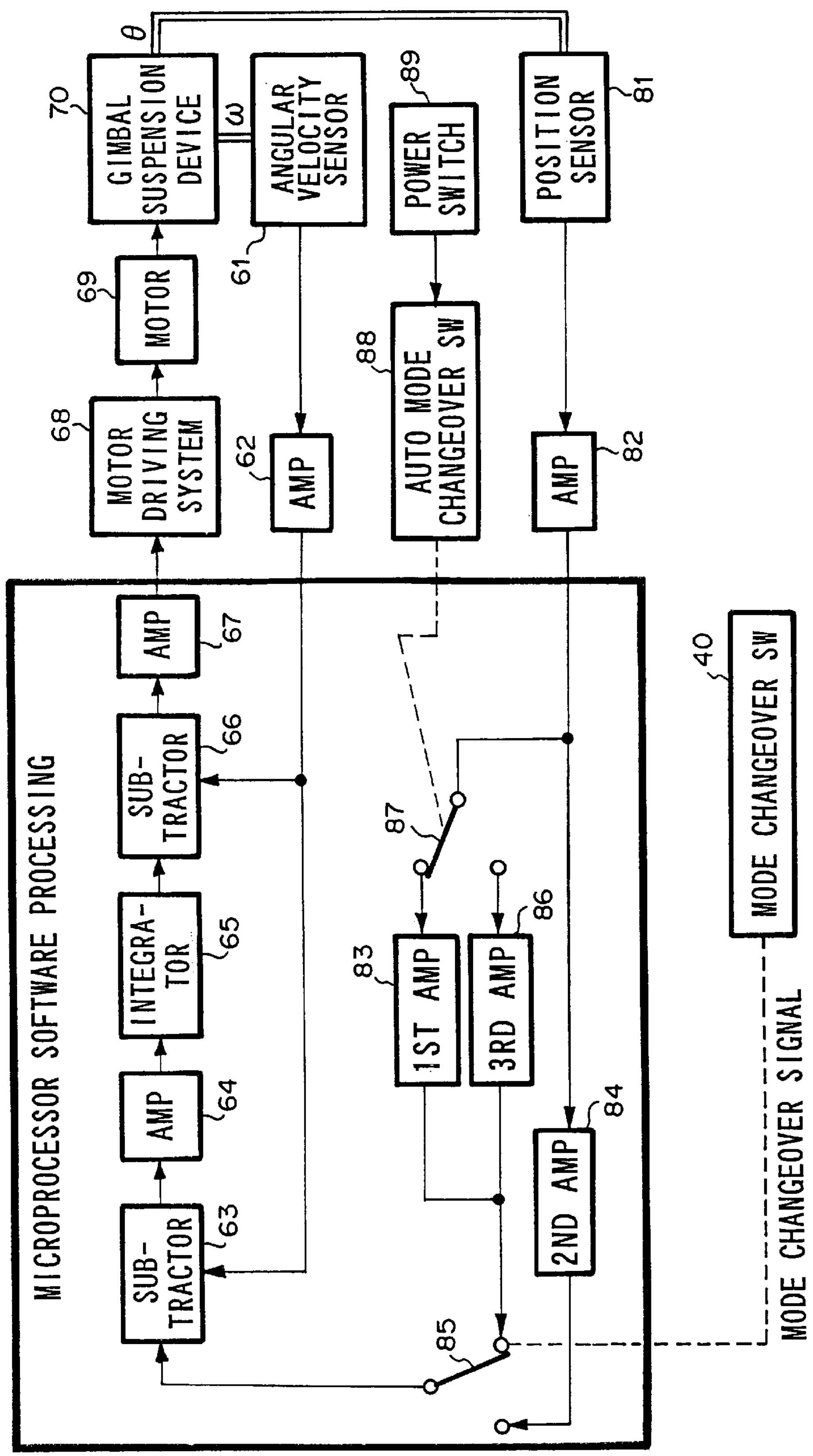

IMAGE STABILIZING APPARATUS

RELATED APPLICATIONS

This application claims the priorities of Japanese Patent Application No. 11-275168 filed on Sep. 28, 1999 and Japanese Patent Application No. 11-275610 filed on Sep. 29, 1999, which are incorporated herein by reference.

BACKGROUND OF THE INVENTION

1. Field of the Invention

The present invention relates to an image stabilizing apparatus, disposed within an optical apparatus such as monocular, binoculars, and video camera, for preventing optical images from being observed in a blurred state due to the fluctuation in emission angle of luminous flux from an observation object with respect to the optical axis of the optical apparatus when the optical apparatus is vibrated.

2. Description of the Prior Art

When an optical apparatus aimed at optical observation, such as monocular and binoculars, is operated as being held with a hand, when the optical apparatus is used in an airplane, vehicle, or the like in particular, the vibration or rocking of the airplane, vehicle, or the like is transmitted to the optical apparatus, so that the emission angle of luminous flux from an observation object with respect to the optical axis fluctuates, whereby the optical image to be observed often deteriorates. Even if the vibration transmitted to such an optical apparatus has small amplitude, the angle of fluctuation with respect to the optical axis is enlarged since the field of view is narrow in the monocular, binoculars, and the like, and since the observation object is viewed under magnification therein. Therefore, even at the time of rocking with a relatively low angle fluctuating speed, the observation object may rapidly move within the field of view, and go out of sight when the angle of fluctuation is large, which is inconvenient. At the time of rocking with a relatively high angle fluctuating speed, on the other hand, the angle fluctuating speed of the image of observation object is observed as being increased by the power of optical apparatus even when the fluctuation angle is relatively small, whereby the image blurs and deteriorates, which is inconvenient.

Conventionally, various image stabilizing apparatus for preventing observation images from being deteriorated due to fluctuations in the emission angle of luminous flux with respect to the optical axis due to the vibration and rocking transmitted to optical apparatus have been proposed.

For example, Japanese Patent Publication No. 57-37852 discloses binoculars comprising therein anti-vibration means utilizing a rotary inertial member (gyro motor) in order to correct the blur of observation images in the binoculars.

Namely, according to this technique, an erect prism is disposed on the optical axis between an objective lens and an eyepiece of the binoculars and is secured onto gimbal suspension means having the rotary inertial member attached thereto, such that the erect prism is held in substantially the same posture even when the binoculars are vibrated due to camera shake or the like, so as to prevent the observation image of binoculars from blurring.

In such a conventional technique utilizing a rotary inertial member and gimbal suspension means, while images can be stabilized with a high accuracy, a high-speed rotary member is required for yielding a large inertial force within a small space, and a high precision is needed since the vibration generated by the rotary member itself has to be reduced.

Such demands for smaller size, higher speed, and higher precision are problematic in that they impose inconveniences in terms of cost, life, time required for attaining a necessary inertial force after the power is turned on, and the like. If the effective diameter of objective lenses is made greater along with the increase in power or resolution of binoculars, then the erect prism becomes larger, whereby a large inertial force is required, which enhances the above-mentioned problems, and the power consumption increases along therewith.

Therefore, the assignee of the present application has proposed an image stabilizing apparatus (Japanese Unexamined Patent Publication No. 6-250100) in which an angular velocity sensor is mounted to gimbal suspension means in place of the above-mentioned rotary inertial member, and the pivoting of the gimbal suspension means is controlled according to the output value from the angular velocity sensor, so as to fix the posture of the erect prism with respect to the earth (inertial system). According to this apparatus, the erect prism held with the gimbal suspension means basically has an inertial force. In particular, its posture-keeping capability against vibrations with relatively large amplitude is high with respect to high-speed vibrations with a high vibration frequency. Therefore, the control power for the rotational position according to the angular velocity sensor can be kept small. In other image stabilizing apparatus which drive vari-angle prisms or lenses, however, active driving sections are needed, and it is necessary for the driving sections to be operated at a high speed in order to correct large amplitude in high-frequency vibrations, whereby correction in a wide angle range is difficult.

When binoculars and video cameras are used, panning and tilting are often carried out at a high speed. For example, fast pan/tilt operations are required when flying objects such as birds and airplanes are observed while being tracked.

Hence, if not only the angular velocity of gimbal suspension means but also its angular position is detected, and feedback control is carried out for image stabilization according to both of the detected values, then the optical system within the apparatus can smoothly track the observation object in its moving direction upon tilting/panning.

Here, if the gain of feedback loop based on the angular position is nonlinearly enhanced when the pivoting angle of gimbal suspension means becomes greater as disclosed in Japanese Utility Model Publication No. 7-5727, then the track ability upon panning/tilting can fully be enhanced.

It is preferred that the observation object can be observed in a tracking manner in the state free of camera shake upon panning/tilting as well. In the case where the gain of feedback loop based on angular position is nonlinearly enhanced as described in the above-mentioned publication, however, the gain is kept higher throughout panning/tilting, whereby anti-vibration performances would be sacrificed during this time. Also, there occurs a problem that a time lag (time difference between the time when a pan/tilt operation is started and the time when the gimbal suspension means arrives at an angular position where it recognizes the pan/tilt operation) occurs after the starting of pan/tilt operation until the gimbal suspension means begins moving.

In view of such circumstances, it is an object of the present invention to provide an image stabilizing apparatus which can observe the observation object in a tracking manner while securing anti-vibration performances, such as improvement in the response of gimbal suspension means, upon panning/tilting.

While the angular velocity of gimbal suspension means is detected by an angular velocity sensor such as piezoelectric vibrator gyro, a CR circuit 92 is connected to the output side of this angular velocity sensor 91 as shown in FIG. 15A, so as to cancel offset voltages and temperature drift voltages, whereby a detection signal centered at a predetermined reference voltage $V_{ref}$ is outputted to an amplifier.

If the CR circuit 92 is provided as such, then the CR circuit 92 functions as a high-pass filter, whereby it becomes difficult to detect vibrations in a low frequency region such as camera shake.

As the capacity C of the capacitor 93 or resistance R of the resistor constituting the CR circuit 92 is made greater, the detectable vibration can extend to a lower frequency range. Since the time constant $\tau$(=CR) becomes greater in this case, the stabilizing time ($\Delta t$) from the starting of pivoting control (power ON) until when the output voltage is stabilized becomes longer as shown in FIG. 16A. The behavior of gimbal suspension means during this time is problematic in that, as shown in FIG. 16B, it travels to an end of its operating freedom so as to abut to a mechanical stopper and then returns to the midpoint of operating freedom as the output voltage approaches the reference voltage $V_{ref}$, thereby being likely to lose sight of the observation object.

If the stabilizing time upon starting the pivoting control is shortened, then the gimbal suspension means can be restrained from behaving unstably. Generally considerable as a method of shortening the stabilizing time upon starting the pivoting control is one in which an analog switch 95 is disposed in parallel with the resistor 94 of the CR circuit 92 as shown in FIG. 15B such that the resistor is short-circuited by the analog switch 95 upon starting the pivoting control.

Since the angular velocity sensor 91 is disposed within a very narrow space in optical apparatus such as monocular and binoculars, it is quite difficult to secure a space for installing the analog switch 95 on a circuit board thereof, and further cut down the cost.

In view of such circumstances, it is another object of the present invention to provide an image stabilizing apparatus which can stabilize the behavior of gimbal suspension means upon starting the pivoting control while extending the detectable vibration to a lower frequency region.

SUMMARY OF THE INVENTION

In a first aspect, the present invention provides an image stabilizing apparatus mounted in an optical apparatus having a monocular or binocular optical system in which an erect prism is disposed between an objective lens and an eyepiece, whereas the objective lens and eyepiece of the optical system are secured within a case;

the image stabilizing apparatus comprising:

gimbal suspension means, adapted to pivotally attach the erect prism to the case, having two pivotal axes extending sidewise and vertical directions of the optical apparatus, respectively;

an actuator for pivoting the gimbal suspension means about the two pivotal axes;

two angular position detecting means for detecting respective angular positions of the gimbal suspension means about the two pivotal axes;

two angular velocity detecting means, secured to the gimbal suspension means, for detecting respective angular velocities of the gimbal suspension means about the two pivotal axes;

feedback control means for driving the actuator, according to an angular position and angular velocity detected by the angular position detecting means and angular velocity detecting means, so as to fix the erect prism with respect to an inertial system and controlling the pivoting of the gimbal suspension means; and gain enhancing means for enhancing a gain of a feedback loop based on the angular position when the angular velocity is at a first set value or higher until the angular velocity becomes a second set value or lower.

In this configuration, the second set value may be identical to or different from the first set value. However, it is preferred that the second set value be a value smaller than the first set value by a certain extent.

Preferably, the above-mentioned configuration further comprises gain switching means for enhancing the gain of feedback loop based on the angular position upon manual switching.

In a second aspect, the present invention provides an image stabilizing apparatus mounted in an optical apparatus having a monocular or binocular optical system in which an erect prism is disposed between an objective lens and an eyepiece, whereas the objective lens and eyepiece of the optical system are secured within a case;

the image stabilizing apparatus comprising:

gimbal suspension means, adapted to pivotally attach the erect prism to the case, having two pivotal axes extending sidewise and vertical directions of the optical apparatus, respectively;

an actuator for pivoting the gimbal suspension means about the two pivotal axes;

two angular position detecting means for detecting respective angular positions of the gimbal suspension means about the two pivotal axes;

two angular velocity detecting means, secured to the gimbal suspension means, for detecting respective angular velocities of the gimbal suspension means about the two pivotal axes;

feedback control means for driving the actuator, according to an angular position and angular velocity detected by the angular position detecting means and angular velocity detecting means, so as to fix the erect prism with respect to an inertial system and controlling the pivoting of the gimbal suspension means; and gain enhancing means for enhancing a gain of a feedback loop based on the angular position until a lapse of a predetermined time after starting the pivoting control of the gimbal suspension means.

Though not restricted in particular, the gain characteristic of feedback loop based on the angular position within the predetermined time is preferably set such that the gain is fixed at a higher value immediately after starting the pivoting control and then gradually decreases.

Preferably, the predetermined time is set to substantially the same value as the time required for an output voltage from the angular velocity detecting means to converge onto a reference voltage $V_{ref}$ after a power switch is turned ON.

BRIEF DESCRIPTION OF THE DRAWINGS

FIG. 1 is a block diagram showing a control loop of the image stabilizing apparatus in accordance with a first embodiment of the present invention;

FIG. 2 is a sectional view, taken along a horizontal plane, showing binoculars incorporating therein the image stabilizing apparatus in accordance with the first embodiment of the present invention;

FIG. 4 is a lateral sectional view showing the binoculars incorporating therein the image stabilizing apparatus in accordance with the first embodiment of the present invention;

FIG. 11 is a block diagram showing a control loop of the image stabilizing apparatus in accordance with a modified example of the first embodiment shown in FIG. 1;

FIG. 12 is a block diagram showing a control loop of the image stabilizing apparatus in accordance with a second embodiment of the present invention;

DESCRIPTION OF THE PREFERRED EMBODIMENTS

Figure 3:
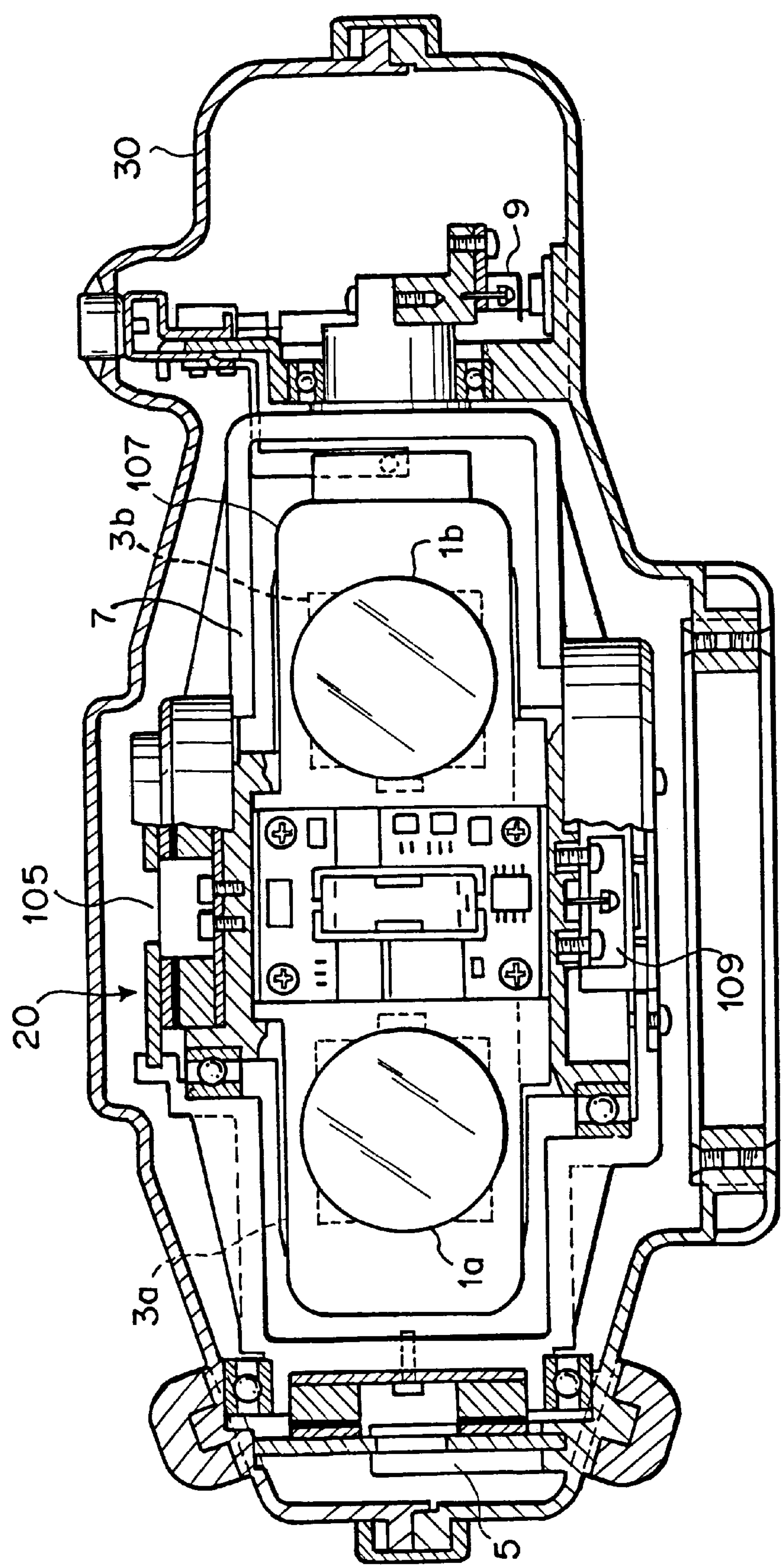
FIG. 3 is a frontal sectional view showing the binoculars incorporating therein the image stabilizing apparatus in accordance with the first embodiment of the present invention.
Figure 5:
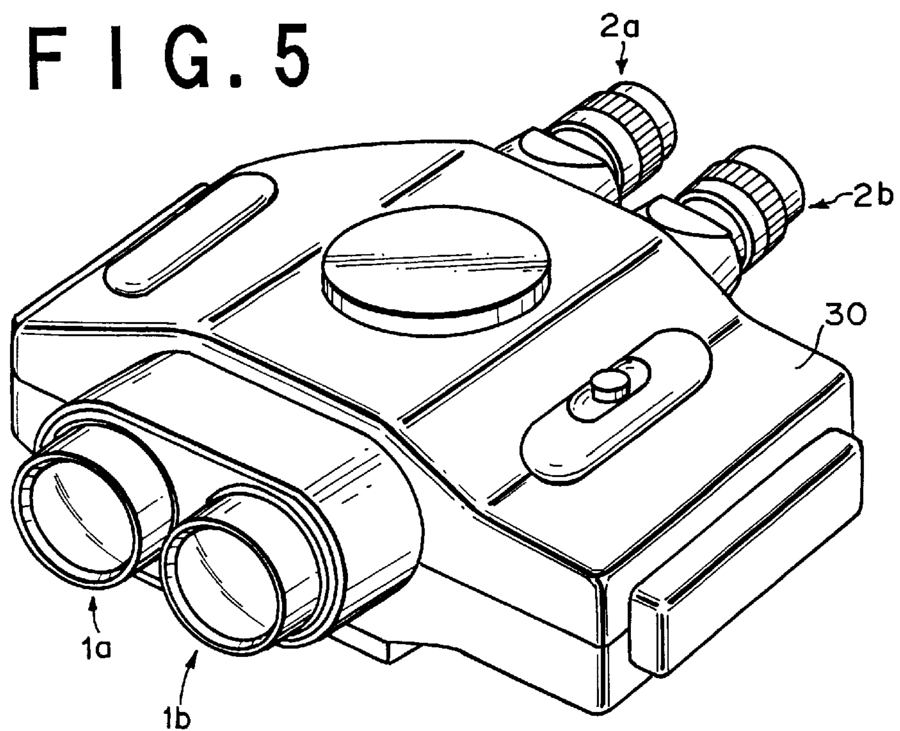
FIG. 5 is a perspective view showing the binoculars incorporating therein the image stabilizing apparatus in accordance with the first embodiment of the present invention.

In the following, embodiments of the present invention will be explained with reference to the drawings.

FIGS. 2 to 5 are a sectional view taken along a horizontal plane, frontal sectional view, lateral sectional view, and perspective view showing the state where the image stabilizing apparatus in accordance with a first embodiment of the present invention is incorporated in binoculars, respectively. As depicted, the binoculars in which the image stabilizing apparatus 20 of this embodiment is incorporated in a case 30 comprise a pair of objective lens systems 1*a*, 1*b*; a pair of eyepiece systems 2*a*, 2*b*; and a pair of erect prisms 3*a*, 3*b*. The objective lens 1*a*, eyepiece 2*a*, and erect prism 3*a* constitute a first telescope system 10*a*. Similarly, the objective lens 1*b*, eyepiece 2*b*, and erect prism 3*b* constitute a second telescope system 10*b*. The first and second telescope systems 10*a*, 10*b* as a pair constitute a binocular system.

A pair of objective lens systems 1*a*, 1*b* and a pair of eyepieces 2*a*, 2*b*, constituting the binocular system, are secured to the case 30 of the optical apparatus. The erect prisms 3*a*, 3*b* are pivotally attached to the case 30 by way of gimbal suspension members 7, 107 having pivotal axes 6, 106 (see FIG. 6) extending in the vertical direction of the apparatus (the direction orthogonal to both the optical axis and aligning direction of objective lens systems 1*a*, 1*b*) and the sidewise direction of the apparatus (the aligning direction of objective lenses 1*a*, 1*b*), respectively.

Also, the back side of the case 30 is provided with a main switch 50 and a gain changeover instruction switch 40 which enables the switching of gain, in a control loop which will be explained later, to be operated from the outside.

In the following, fundamental functions on which the apparatus in accordance with this embodiment is based will be explained with reference to FIGS. 6 and 7. In this specification, the vertical direction of apparatus refers to the direction of arrow A in FIG. 6, whereas the sidewise direction of apparatus refers to the direction of arrow C in FIG. 6.

Figure 6:
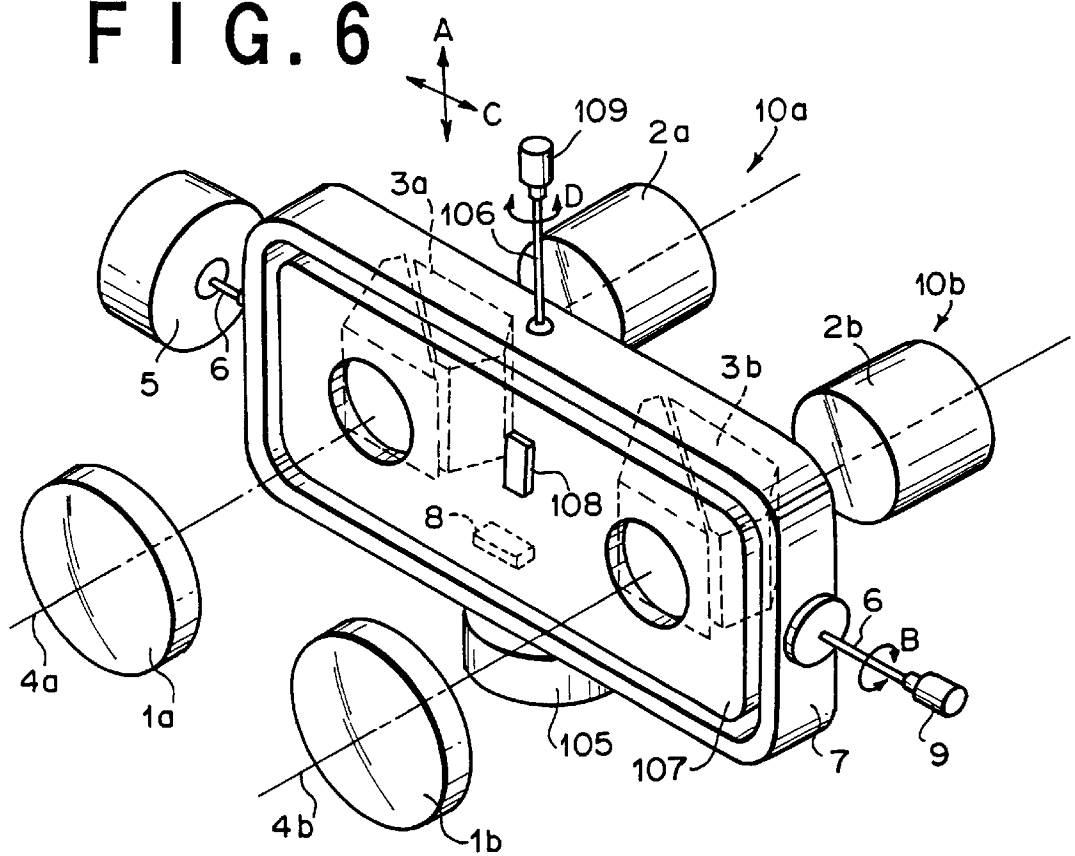
FIG. 6 is a schematic perspective view for explaining functions of the image stabilizing apparatus in accordance with the first embodiment of the present invention.
Figure 7:
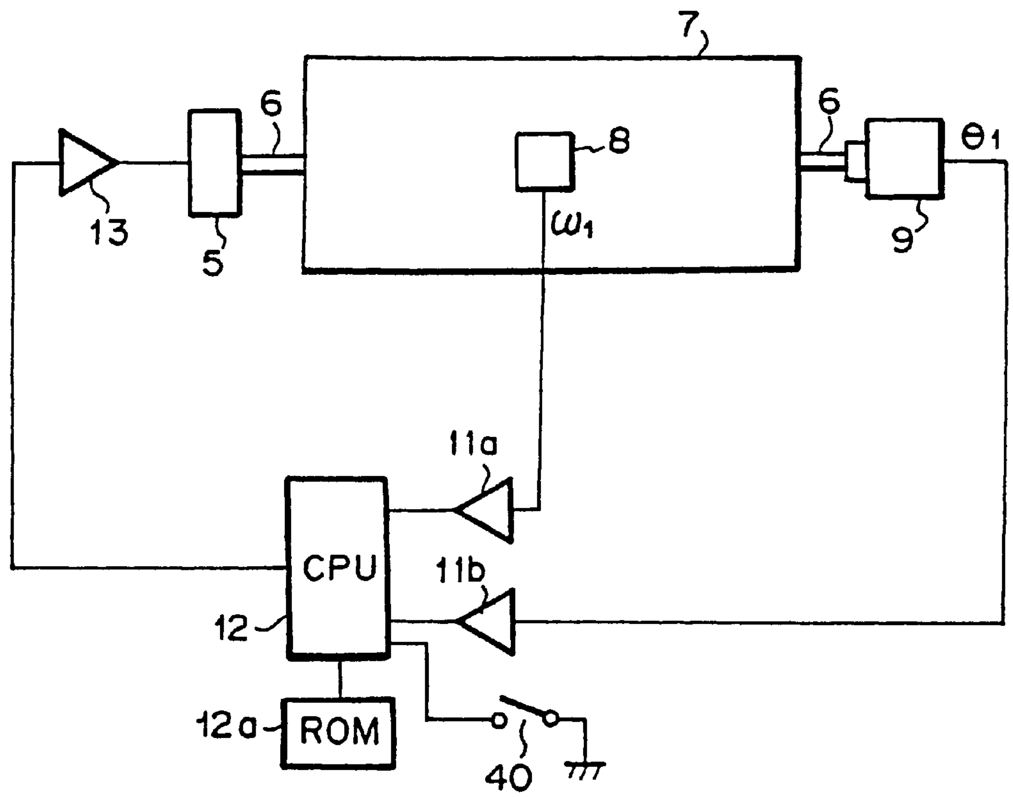
FIG. 7 is a block diagram for explaining functions of the image stabilizing apparatus in accordance with the first embodiment of the present invention.

The optical apparatus attains a configuration of a common binocular system in the state where the gimbal suspension members 7, 107 having the above-mentioned erect prisms 3*a*, 3*b* attached thereto are fixed with respect to the case 30, i.e., where the erect prisms 3*a*, 3*b* attached to the gimbal suspension members 7, 107 are resultantly secured to the case 30, in FIG. 6. The respective optical axes 4*a*, 4*b* of the telescope optical systems 10*a*, 10*b* at this time will be referred to as optical axes of the optical apparatus.

Appropriate positions for disposing the objective lens systems 1*a*, 1*b*; erect prisms 3*a*, 3*b*; gimbal suspension members 7, 107; pivotal axes 6, 106; and the like are explained in detail in known literatures (e.g., Japanese Patent Publication No. 57-37852) and will not be repeated here.

In the apparatus of this embodiment, as shown in FIG. 6, the inner gimbal suspension member 107 is axially supported by the outer gimbal suspension member 7, so that the gimbal suspension device has an inner/outer double structure. While the outer gimbal suspension member 7 is pivoted by the pivotal axis 6 extending in the sidewise direction of the apparatus, so as to correct the blurring of images with respect to the vertical direction; the inner gimbal suspension member 107 is pivoted by the pivotal axis 106 extending in the vertical direction of the apparatus, so as to correct the blurring of images with respect to the sidewise direction. The erect prisms 3*a*, 3*b* are attached to the inner gimbal suspension member 107. In FIG. 6, the vertical relationship is shown opposite to that in FIGS. 2 to 5.

An angular velocity sensor 8 is secured to the center part of the upper wall portion of the outer gimbal suspension member 7, whereas an angular velocity sensor 108 is secured to the center part of the front wall portion of the inner gimbal suspension member 107. The angular velocity sensor 8 is a sensor which detects, when the outer gimbal suspension member 7 pivots in the direction of arrow B along with the vertical fluctuation of the case 30, its rotational angular velocity $\omega_1$. On the other hand, the angular velocity sensor 108 is a sensor which detects, when the inner gimbal suspension member 107 pivots in the direction of arrow D along with the sidewise fluctuation of the case 30, its rotational angular velocity.

For carrying out positional feedback control in addition to the velocity feedback control based on the detected angular velocity, a position sensor 9 for detecting the rotational angle $\theta_1$ of the pivotal axis 6 is attached to one end of the pivotal axis 6. Attached to the other end of the pivotal axis 6 is a rotary motor 5 for pivoting the pivotal axis 6 of the gimbal suspension member 7 so as to cause the erect prisms 3*a*, 3*b* to always restore their initial postures against the fluctuation of the case 30 according to the detected values from the angular velocity sensor 8 and position sensor 9. On the other hand, for carrying out positional feedback control in addition to the velocity feedback control based on the detected angular velocity, a position sensor 109 for detecting the rotational angle of the pivotal axis 106 is attached to one end of the pivotal axis 106. Attached to the other end of the pivotal axis 106 is a rotary motor 105 for pivoting the pivotal axis 106 of the gimbal suspension member 107 so as to cause the erect prisms 3*a*, 3*b* to always restore their initial postures against the fluctuation of the case 30 with respect to the sidewise direction according to the detected values from the angular velocity sensor 108 and position sensor 109.

A basic concept of control loop in the apparatus of this embodiment will now be explained with reference to FIG. 7. As depicted, this apparatus comprises amplifiers 11*a*, 11*b* for amplifying the angular velocity signal from the angular velocity sensor 8 and the angular signal from the position sensor 9, respectively; a CPU 12 for computing the amount of driving of the rotary motor 5 so as to cause the erect prisms 3*a*, 3*b* to restore their original postures according to the angular velocity signal and angular signal and outputting a control signal based on this computation; and a motor driving circuit 13 for amplifying the control signal from the CPU 12 and driving the rotary motor 5. Connected to the CPU 12 are a ROM 12*a* storing various kinds of programs, and the gain changeover instruction switch 40 for instructing the CPU 12 to change the gain in the control loop. As with the detected signals from the angular velocity sensor 8 and position sensor 9, the detected signals from the angular velocity sensor 108 and position sensor 109 are converted into a control signal by a control loop similar to that shown in FIG. 7, and the rotary motor 105 is driven by this control signal.

Therefore, while two sets of control loops are necessary for causing the two, i.e., inner and outer, gimbal suspension members 7, 107 to restore their original postures in the apparatus of this embodiment, the CPU 12 may be used in common.

A detailed configuration of the control loop will now be explained with reference to FIG. 1.

This control loop is constituted by two feedback loops, i.e., a velocity (angular velocity) feedback loop and a position (angle) feedback loop. Also, this control loop is constituted by a combination of a software loop constructed by microprocessor programs in the CPU 12, and a hardware loop.

First, the velocity feedback loop detects the angular velocity co of a gimbal suspension device 70 (7, 107) about the pivotal axis 6, 106 with an angular velocity sensor 61 (8, 108). Thus detected value ω is amplified by a hardware amplifier 62 and then is negatively fed back to a motor driving system 68 (first velocity feedback loop). As a consequence, an opposite rotational torque is generated in a motor 69, whereby control is effected such that the gimbal suspension device 70 restores its original posture against vibrations such as camera shake, i.e., the erect prisms 3*a*, 3*b* are secured with respect to the earth (inertial system) against vibrations with a large angular velocity.

Also, in this velocity feedback loop, the value detected by the angular velocity sensor 61 is fed into an integrator 65 by way of a subtractor 63 and an amplifier 64. Then, in a subtractor 66, the detected value directly fed from the amplifier 62 is subtracted from the output value of the integrator 65, and the result of subtraction is negatively fed back to the motor driving system 68 (second velocity feedback loop). Since the value detected by the angular velocity sensor 61 is negatively fed back by way of the integrator 65, the control system can function even when the offset is zero with respect to a velocity command, i.e., when a velocity input value and a velocity output value of the feedback loop are identical to each other. Also, since the loop gain can be duplexed, the gimbal suspension device 70 can be stabilized at a higher speed (stabilizing accuracy can be raised).

The integrator 65 functions to average input values, whereas its output value is subjected to subtraction with the detected angular velocity value in the subtractor 66. Therefore, the integrator 65 can be considered to have a damper function for preventing the first velocity feedback loop from oscillating.

On the other hand, the position feedback loop detects the angular position θ of the gimbal suspension device 70 about the pivotal axis 6, 106 with a position sensor 81 (9, 109), amplifies thus detected value with a hardware amplifier 82, and then sends back thus amplified value to the motor driving system 68 thereby controlling the rotary motor 69 (5, 105) such that the gimbal suspension device 70 approaches the angular position $\theta_0$ of the midpoint on the collimation axis. Amplifier 67 drives the motor driving system as shown in FIGS. 1, 11 and 12.

There are cases where optical apparatus such as binoculars are greatly panned or tilted. When the above-mentioned velocity feedback loop is used alone for control in such cases, its response to panning or tilting is unfavorable, whereby the gimbal suspension device 70 may pivot so greatly that it collides with the case 30 at a movable limit portion thereof.

Therefore, if it is detected that the gimbal suspension device 70 has pivoted greatly in this position feedback loop, then a signal corresponding to the detected value is sent back to the motor driving system 68, whereby the motor 69 is driven so as to powerfully return the gimbal suspension device 70 toward the midpoint on the collimation axis. As a consequence, upon panning, tilting, and the like, the gimbal suspension device 70 is prevented from unexpectedly colliding with the case 30 at movable limit portions thereof, and its tracking characteristic is made favorable when carrying out panning or tilting.

This position feedback loop is configured such that the detected signal from the position sensor 81 is basically fed back by way of a first amplifier 83. As indicated by the solid line in FIG. 9, the amplification factor of the first amplifier 83 has such a linear characteristic that it gradually increases as the pivoting angle of the gimbal suspension device 70 enhances, whereas the gradient of this linear characteristic is set to a relatively small value. Namely, the first amplifier 83 is set so as to suppress the gain of position feedback loop (position gain) to a relatively low level, thereby yielding a mode (anti-vibration mode) attributing more importance to anti-vibration performances.

When binoculars are used in practice, flying objects such as birds and airplanes are often observed while being tracked. Fast pan/tilt operations, fast panning in particular, are required in such a case. Since it is necessary for the optical system in the apparatus to smoothly track the observation object in its moving direction, such a panning operation necessitates a function contradictory to the above-mentioned anti-vibration function for securing the optical system to its original position. Hence, it is rather necessary to nullify the above-mentioned anti-vibration function when carrying out such a pan/tilt operation.

Therefore, this embodiment is configured such that a second amplifier 84 having a higher amplification factor is disposed within the position feedback loop in parallel with the first amplifier 83 having a lower amplification factor, whereas the first amplifier 83 and second amplifier 84 can be switched therebetween by a software switch section 85. As indicated by the broken line in FIG. 9, the amplification factor of the second amplifier 84 has such a linear characteristic that it gradually increases as the pivoting angle of the gimbal suspension device 70 enhances, whereas the gradient of this linear characteristic is set to a value much greater than that in the first amplifier 83.

The changeover of the software switch section 85 is carried out when the operator switches the mode changeover switch 40 on the back side of the case 30 in response to circumstances. When the software switch section 85 is connected to the second amplifier 84, the position gain is set greater, whereby a mode (panning mode) attributing more importance to tracking performances is attained.

Further, this embodiment is configured such that, even when the operator selects the anti-vibration mode, the tracking performance will be enhanced while minimizing the decrease in the anti-vibration performance if a pan/tilt operation is carried out. A specific configuration therefor is as follows.

Namely, as shown in FIG. 1, it is configured such that a third amplifier 86 having a higher amplification factor is disposed in parallel with the first amplifier 83, whereas the first amplifier 83 and third amplifier 86 can be switched therebetween by a software switch section 87. As indicated by the chain-dotted line in FIG. 9, the amplification factor of the third amplifier 86 has such a linear characteristic that it gradually increases as the pivoting angle of the gimbal suspension device 70 enhances, whereas the gradient of this linear characteristic is set to a value much greater than that in the first amplifier 83.

The changeover of the software switch section 87 is effected by an output signal from an automatic mode changeover switch 88. The automatic mode changeover switch 88 is configured such that an output voltage $V_G$ is fed therein from the amplifier 62 of velocity feedback loop. While this output voltage $V_G$ has a value corresponding to the detected value of angular velocity, the averaged value after A/D conversion is used.

The automatic mode changeover switch 88 is configured such that the software switch section 87 is connected to the first amplifier 83 if the output voltage (angular velocity) $V_G$ is lower than a first set value $T_1$, the software switch section 87 is connected to the third amplifier 86 if the output voltage $V_G$ is at the first set value $T_1$ or higher, and the software switch section 87 is connected to the first amplifier 83 again if the output voltage $V_G$ becomes a second set value $T_2$ or lower after becoming the first set value $T_1$ or higher. The first and second set values $T_1$ and $T_2$ will be explained later.

Figure 10:
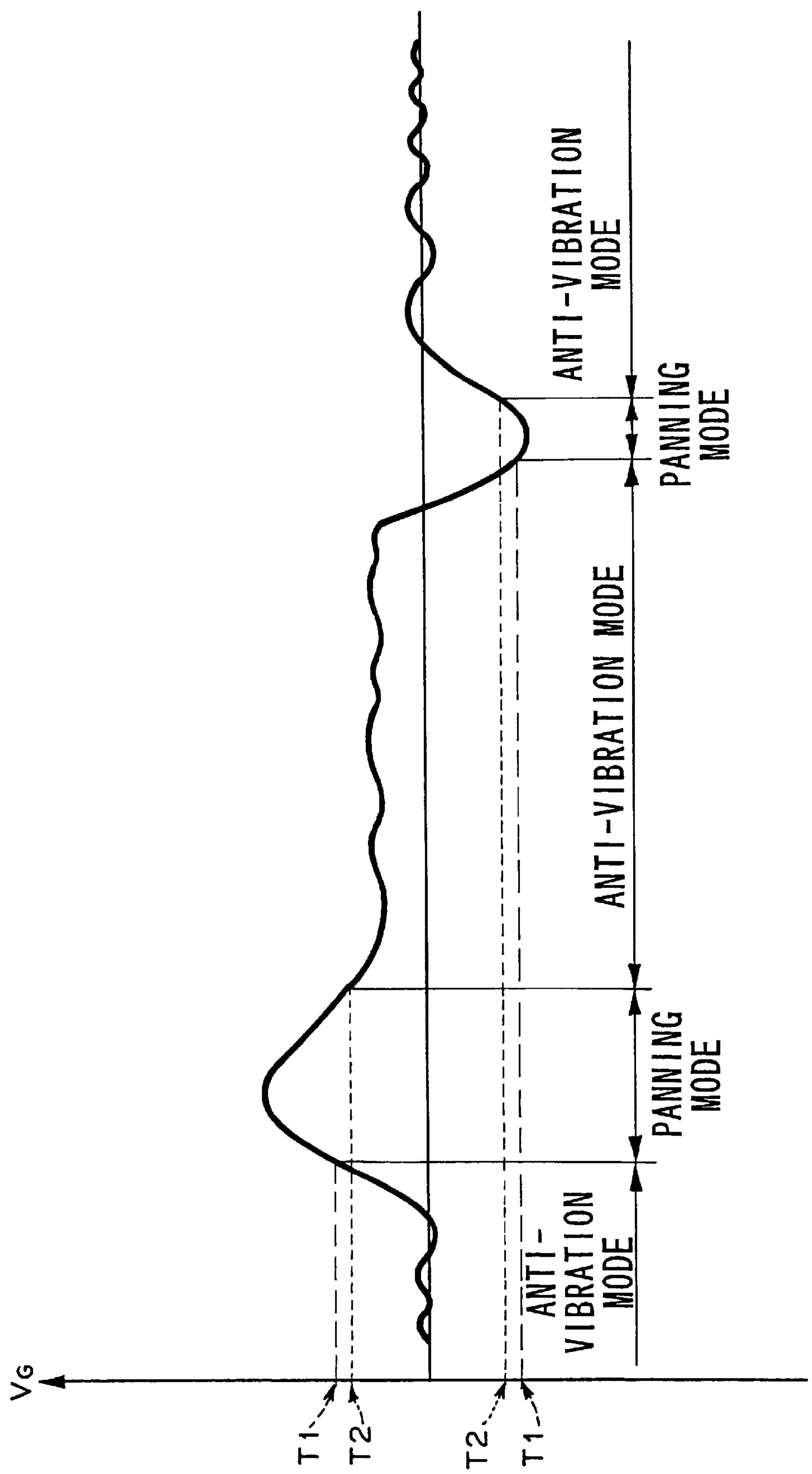
FIG. 10 is a chart showing operations of the image stabilizing apparatus in accordance with the first embodiment of the present invention.

FIG. 10 is a chart showing how the output voltage (angular velocity) $V_G$ changes upon panning.

As represented, an accelerating operation occurs immediately after starting panning, whereby the output voltage (angular velocity) $V_G$ drastically increases from zero and then decreases to a certain extent. In the middle of panning, a substantially constant velocity operation is carried out, whereby the output voltage $V_G$ shifts by a low value. Immediately before ending the panning, a decelerating operation occurs, whereby the output voltage $V_G$ rapidly changes to the minus side and then converges toward zero.

The first set value $T_1$ is set to a value which the output voltage $V_G$ passes when the latter drastically increases immediately after the starting of panning, whereas the second set value $T_2$ is set to a value which the output voltage $V_G$ passes when the latter drastically decreases immediately before the ending of panning. The second set value $T_2$ is set to a value smaller than the first set value $T_1$ by a certain extent.

The automatic mode changeover switch 88 may be easily constituted by an analog circuit such as a comparator which can set only a threshold if analog control is to be effected in the above-mentioned control circuit of FIG. 1, whereas it may be constituted by a digital comparator if digital control is to be carried out.

In a configuration in which respective triggers for starting and ending the panning mode are obtained from the velocity (angular velocity) feedback loop and position feedback loop, a control circuit such as the one shown in FIG. 11 is used, for example. Namely, a first automatic mode changeover switch 88A is configured such that an output voltage $V_{G1}$ of the amplifier 62 in the velocity feedback loop is fed therein, whereas a second automatic mode changeover switch 88B is configured such that an output voltage $V_{G2}$ of the amplifier 82 in the position feedback loop is fed therein. Also, in this case, the two automatic mode changeover switches 88A and 88B may be constituted by an analog circuit such as a comparator which can set only a threshold if analog control is to be effected, whereas they may be constituted by a digital comparator if digital control is to be carried out.

As explained in detail in the foregoing, this embodiment is configured such that, even when the operator selects the anti-vibration mode, it is automatically switched to a panning mode if a pan/tilt operation is carried out, whereby the tracking performance can be enhanced. Also, without being fixed to the panning mode throughout the pan/tilt operation, the panning mode occurs only immediately after starting and immediately before ending the panning, during which acceleration (deceleration) is high, whereas the anti-vibration mode occurs in the middle of panning where movement is at a substantially constant velocity, whereby the tracking performance can be enhanced while minimizing the decrease in anti-vibration performance.

Upon such mode switching, since the second set value $T_2$ is set to a value smaller than the first set value $T_1$ by a certain extent, control can be stabilized while preventing hunting from occurring.

Also, since the operator can manually select the panning mode with the mode changeover switch 40, this embodiment can fully respond to situations where greater importance is to be placed on the tracking performance in particular.

Figure 13A:
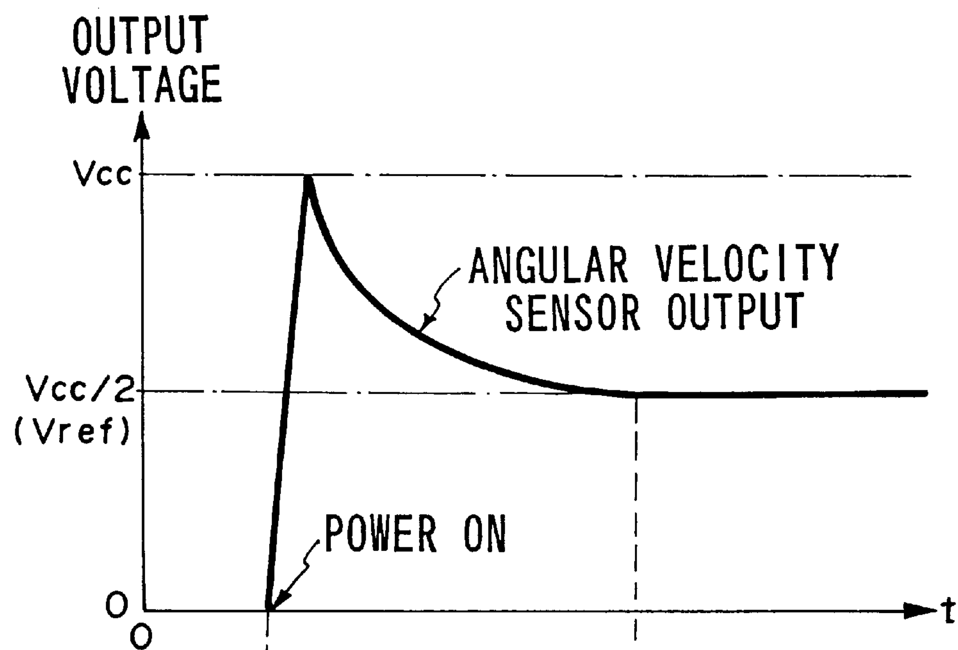
FIGS. 13A and 13B are charts showing characteristics of an output voltage from an angular velocity sensor in the image stabilizing apparatus in accordance with an embodiment of the present invention and behaviors of a gimbal suspension device thereof, respectively.
Figure 13B:
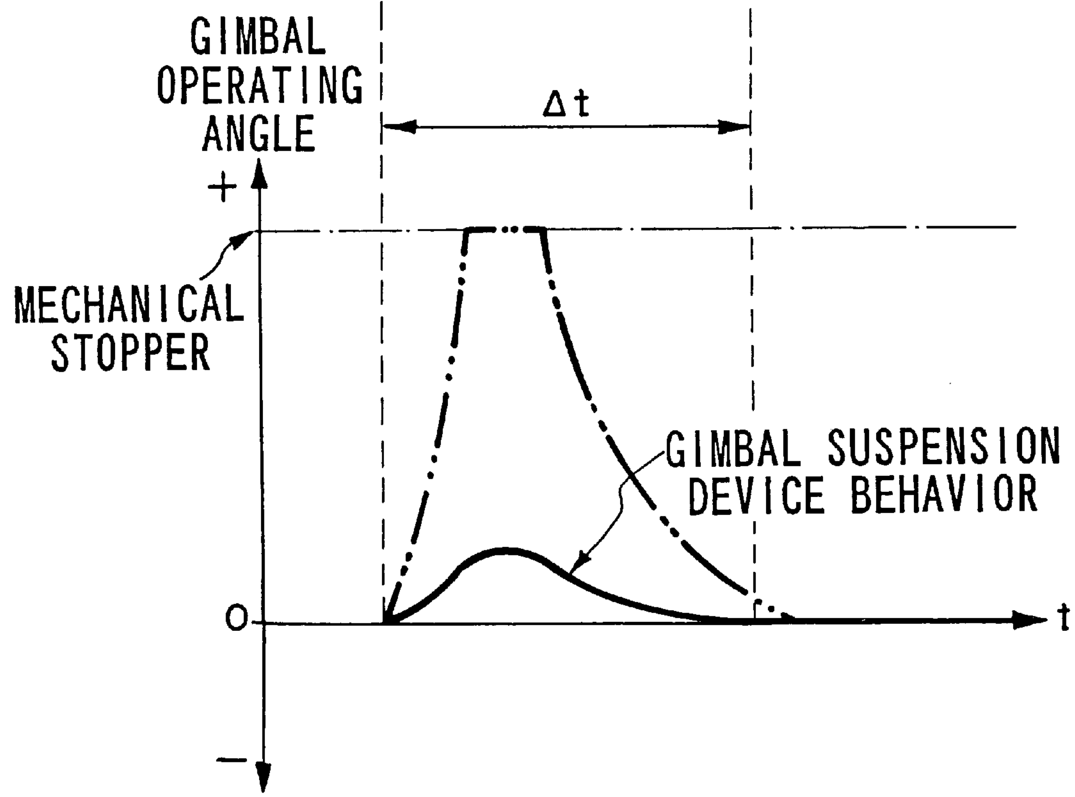
Figure 15A:
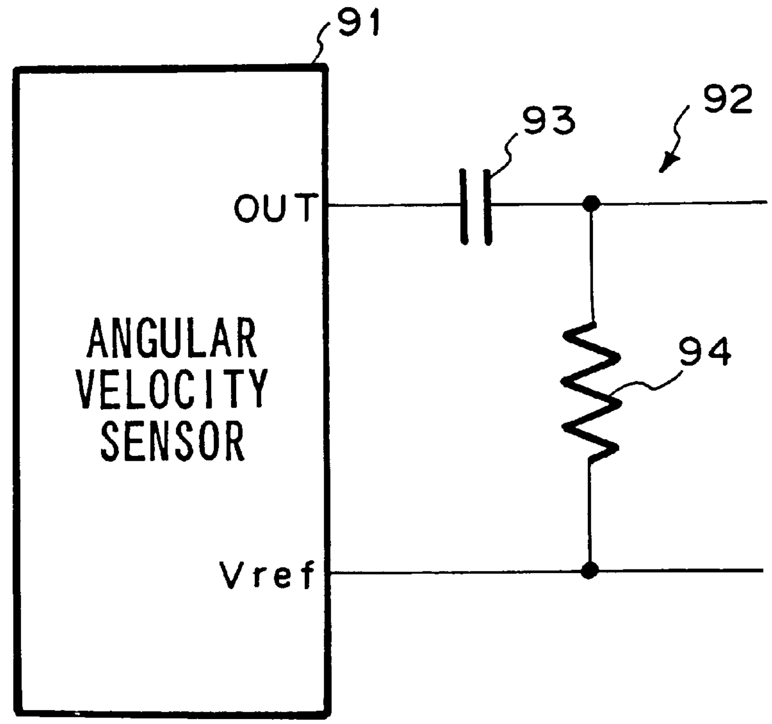
FIGS. 15A and 15B are diagrams showing configurations of the output side of an angular velocity sensor, indicating a typical configuration and a possible configuration, respectively.
Figure 15B:
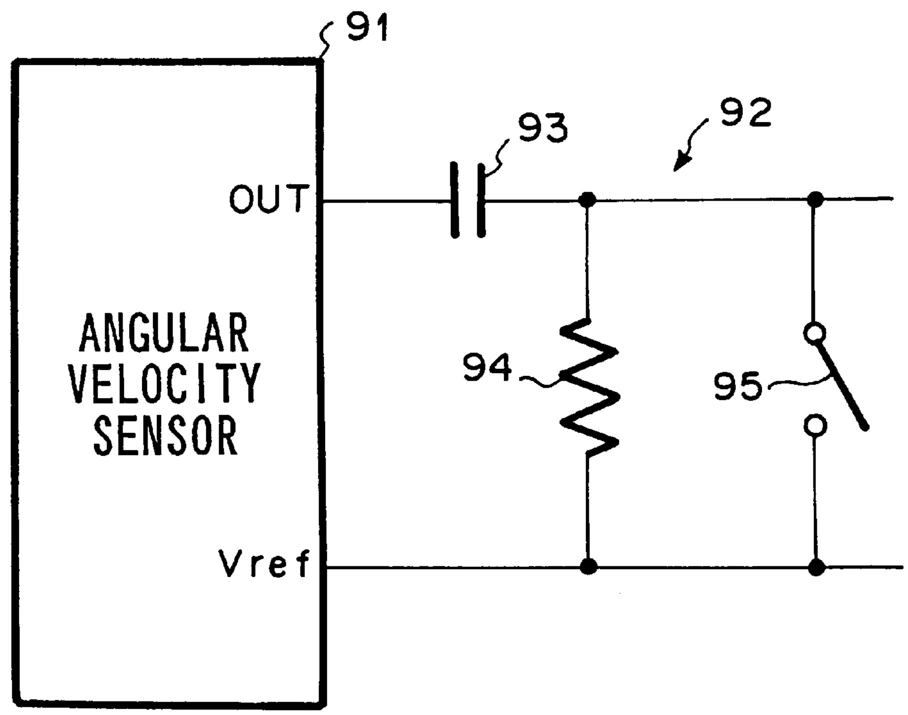
Figure 16A:
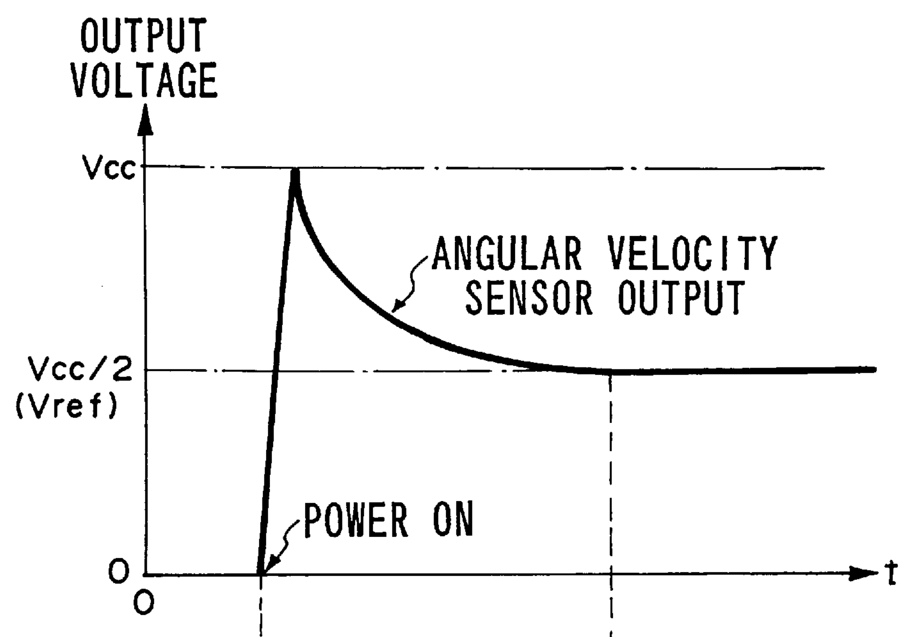
FIGS. 16A and 16B are charts indicating a conventional example, similar to FIGS. 13A and 13B, respectively.
Figure 16B:
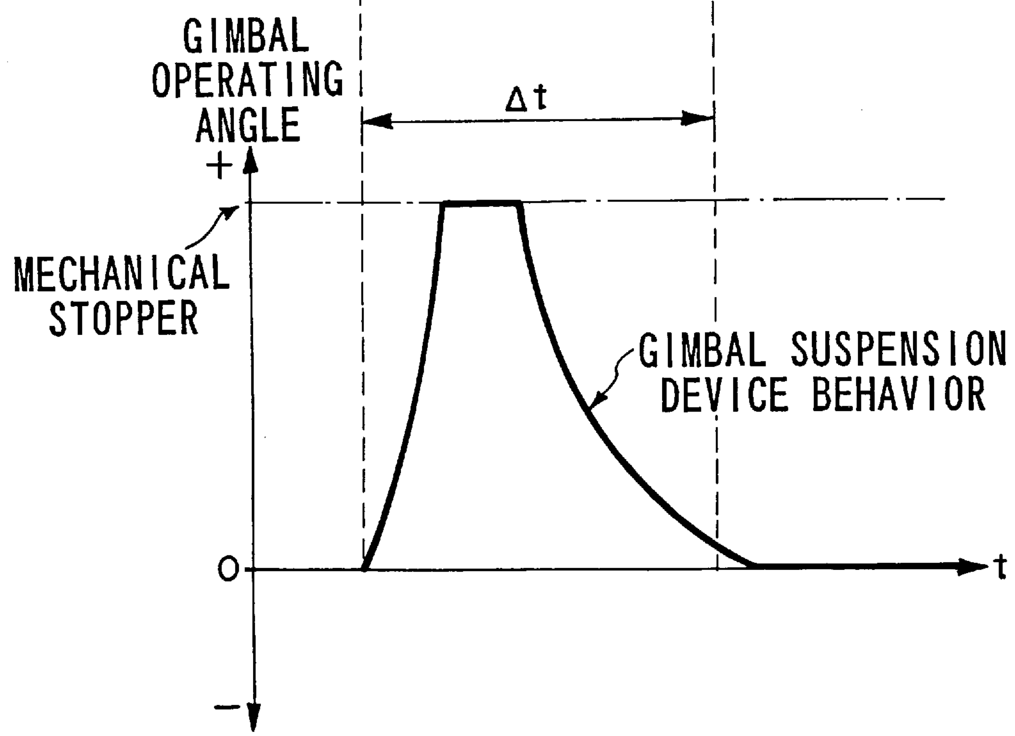

Meanwhile, as shown in FIG. 13A, the output voltage from the angular velocity sensor 61 (91) once rapidly rises to $V_{cc}$ when a power switch 89 is turned ON, and then gradually converges toward a reference voltage $V_{ref}$ (=$V_{cc}$/2). During this period of time, the gimbal suspension device 70 behaves unstably in general such that, as indicated by dash-double-dot line in FIG. 13B, it reaches an end of its operating freedom and abuts to a mechanical stopper, and then returns to the midpoint of its operating freedom as the output voltage approaches the reference voltage $V_{ref}$. Though the behavior of gimbal suspension device 70 can be stabilized to a certain extent by lowering the time constant $\tau$ (=CR) of the CR circuit (see FIG. 15A) disposed on the output side of the angular velocity sensor 61 (91), it becomes difficult to detect vibrations in low frequency regions such as camera shake in this case.

Therefore, the second embodiment of the present invention employs the following configuration in order to stabilize the behavior of gimbal suspension device 70 upon starting the pivoting control while extending the detectable vibration to a lower frequency region.

Namely, as shown in FIG. 12, the second embodiment is configured such that the third amplifier 86 having a higher amplification factor is disposed in parallel with the first amplifier 83, whereas the first amplifier 83 and third amplifier 86 can be switched therebetween by the software switch section 87. The changeover of software switch section 87 is carried out by an output signal from the automatic mode changeover switch 88.

The automatic mode changeover switch 88 is configured such that, when a control starting signal is inputted from the power switch 89, the software switch section 87 is connected to the third amplifier 86 for a predetermined time (which will be explained later) and then is switched to the first amplifier 83.

Figure 9:
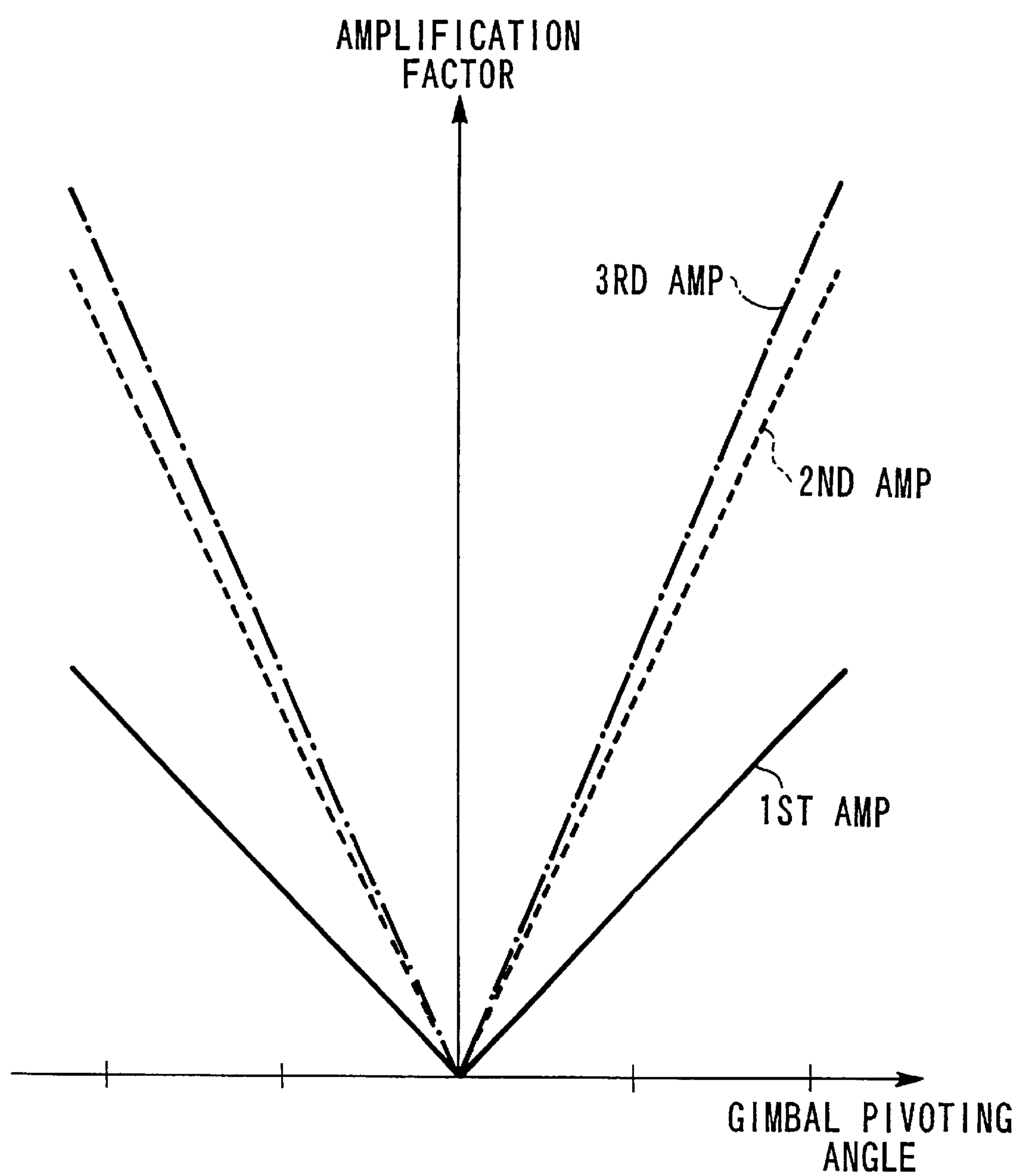
FIG. 9 is a graph showing the respective amplification factors of first, second, and third amplifiers in the image stabilizing apparatus in accordance with the first embodiment of the present invention.

As indicated by the chain-dotted line in FIG. 9, the amplification factor of the third amplifier 86 has such a linear characteristic that it gradually increases as the pivoting angle of the gimbal suspension device 70 enhances, whereas the gradient of this linear characteristic is set to a value much greater than that in the first amplifier 83.

Figure 14:
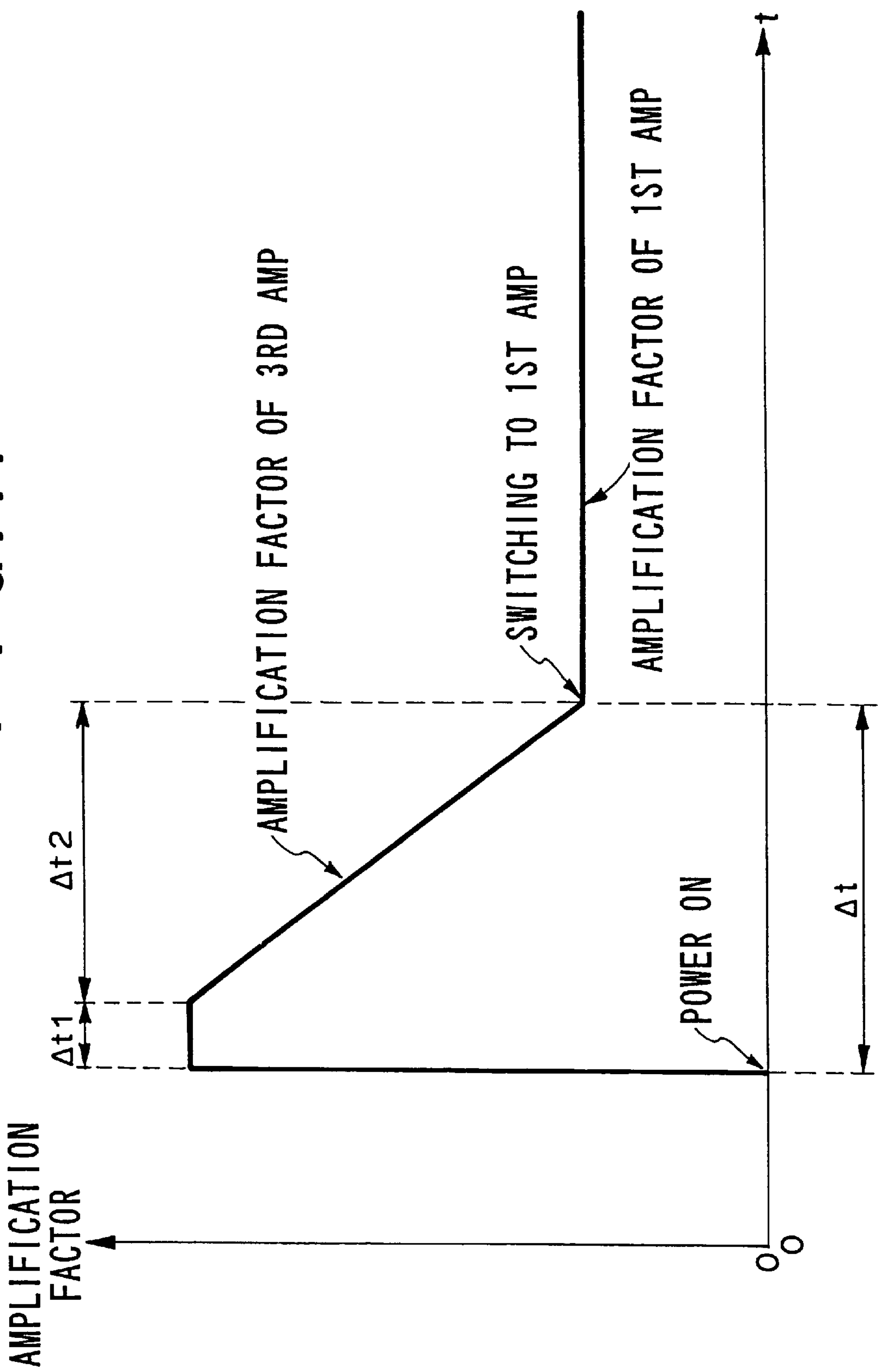
FIG. 14 is a chart showing characteristics of the amplification factor of the above-mentioned third amplifier.

As shown in FIG. 14, the above-mentioned predetermined time (during which the software switch section 87 is connected to the third amplifier 86) is set to a time $\Delta t$. This time At is set to the value identical to the time $\Delta t$ required for the output voltage from the angular velocity sensor 61 (91) to converge onto the reference voltage $V_{ref}$ ($=V_{cc}/2$) after the power switch 89 is turned ON in FIG. 13A. As shown in FIG. 14, the amplification factor of third amplifier 86 is set so as to be fixed to a higher value during a short period of time $\Delta t_1$ immediately after the power switch 89 is turned ON and then gradually decrease during its subsequent period of time $\Delta t_2$ ($=\Delta t-\Delta t_1$). During this period, the gimbal suspension device 70 behaves such that, as indicated by the solid line in FIG. 13B, it somewhat pivots from the midpoint of its operating freedom and then returns to the original midpoint. As a consequence, the behavior of gimbal suspension device 70 is greatly stabilized as compared with the conventional example indicated by the dash-double-dot line in FIG. 13B.

As explained in detail in the foregoing, this embodiment is configured such that the third amplifier 86 is chosen until the time $\Delta t$ passes after the pivoting control of gimbal suspension device 70 is started, so as to enhance the amplification factor, whereby the gain of feedback loop increases. Therefore, even when the time constant $\tau$ of the CR circuit 92 disposed on the output side of the angular velocity sensor 61 (91) is set to such a large value that vibrations in a lower frequency region such as camera shake are detectable, the behavior of gimbal suspension device 70 can be stabilized upon starting the pivoting control. As a consequence, the control can smoothly shift to image stabilizing control without losing sight of the observation object.

Also, in this embodiment, the amplification factor of third amplifier 86 is set so as to be fixed at a higher value during a short period of time $\Delta t_1$ immediately after the power switch 89 is turned ON and then gradually decrease during its subsequent period of time $\Delta t_2$. Therefore, the gain of feedback loop can be prevented from unnecessarily increasing, whereby the shift to image stabilizing control can be effected more smoothly.

Though the gain enhancing time of feedback loop for stabilizing the behavior of gimbal suspension device 70 upon staring the pivoting control is set to the same value as the time At required for the output voltage from the angular velocity sensor 61 (91) to converge onto the reference voltage $V_{ref}$ in this embodiment, operations and effects substantially identical to those of this embodiment can be obtained also when it is set to a value identical to the time constant $\tau(\tau<\Delta t)$ of the CR circuit 92 disposed on the output side of the angular velocity sensor 61 (91), for example.

Figure 8:
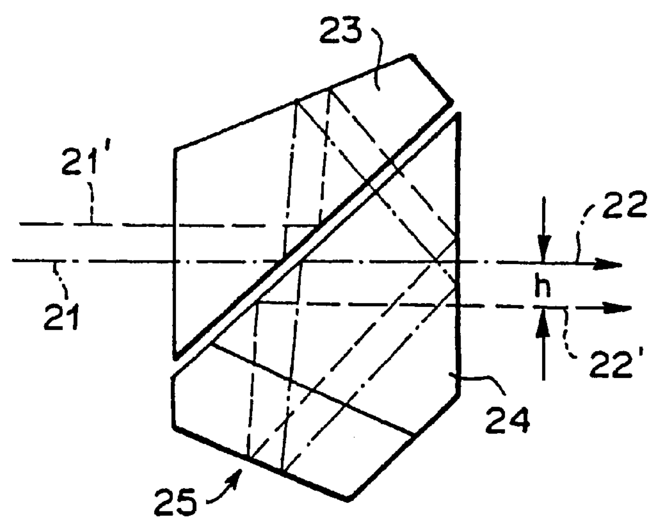
FIG. 8 is a side view for explaining an erect prism shown in FIG. 2.

Examples of the erect prisms 3*a*, 3*b* include Schmidt erect prisms, Abbe erect prisms, bauern fend erect prisms, porro erect prisms, and roof erect prisms. Among them, FIG. 8 shows a Schmidt erect prism. The Schmidt erect prism is constituted by prisms 23, 24 as depicted, whereas a part 25 of the prism 24 acts as a roof reflecting surface. In such an erect prism, there exists a position on the entrance optical axis where the entrance optical axis 21 and the exit optical axis 22 can be formed on the same line as depicted. Such an erect prism in which the entrance optical axis 21 and exit optical axis 22 can be formed on the same line has such a property that, as shown in FIG. 8, a light beam 21' which is parallel to the optical axis 21 and separated upward from the optical axis 21 by h becomes, after passing through the erect prism, a light beam 22' which is parallel to the optical axis 22 and separated downward from the optical axis 22 by h.

The angular velocity sensor 8, 108 is a piezoelectric vibrating gyro sensor comprising a columnar vibrator which is shaped like a cylinder or the like and a plurality of piezoelectric ceramic pieces and utilizing Coriolis force, in which at least two piezoelectric ceramic pieces for detection and at least one piezoelectric ceramic piece for feedback are disposed on a side face of the columnar vibrator.

The piezoelectric ceramic pieces for detection output respective detected signals having values different from each other depending on the vibration. When their difference is computed, an angular velocity is obtained.

The piezoelectric ceramic for feedback is used for correcting the phase of detected signals.

Since the angular velocity sensor 8, 108 has a simple structure and a very small size, the image stabilizing apparatus 20 itself can attain a simple structure and a very small size. Also, since it has a high S/N ratio and a high precision, the angular velocity control can attain a high accuracy.

The image stabilizing apparatus of the present invention is not limited to those in accordance with the above-mentioned embodiments, and can be modified in various manners. For example, as the angular velocity detecting means, not only the piezoelectric vibrating gyro sensor of a columnar vibrator type, but also piezoelectric vibrating gyro sensors of various types such as a triangular prism vibrator type, a quadrangular prism vibrator type, and a tuning-fork-shaped vibrator type can be used. Further, various kinds of other angular velocity sensors can be used.

As the angular position detecting means, various angular sensors such as resolver, synchro, rotary encoder, and the like can also be used in place of the above-mentioned position sensor.

Though the apparatus of the above-mentioned embodiment has a configuration to be employed in binoculars, the image stabilizing apparatus of the present invention can have a configuration applicable to a monocular as well. Also, similar effects can be obtained when the apparatus is mounted to a camera such as video camera.

Since the image stabilizing apparatus in accordance with the first aspect of the present invention is configured such that the gain of feedback loop based on the angular position detected by the angular position detecting means is enhanced when the angular velocity detected by the angular velocity detecting means is at a first set value or higher until it becomes a second set value or lower, it can automatically switch to a panning mode when a pan/tilt operation is carried out, which can enhance the tracking performance. Also, without being fixed to the panning mode throughout the pan/tilt operation, the panning mode occurs only immediately after starting and immediately before ending the panning, during which acceleration (deceleration) is high, whereas the anti-vibration mode occurs in the middle of panning where movement is at a substantially constant velocity, whereby the tracking performance can be enhanced while minimizing the decrease in anti-vibration performance.

Since the image stabilizing apparatus in accordance with the second aspect of the present invention is configured such that the gain of feedback loop based on the angular position is enhanced until a predetermined time passes after the pivoting control of gimbal suspension means is started, the behavior of gimbal suspension means upon starting the pivoting control can be stabilized even when the time constant of the CR circuit disposed on the output side of the angular velocity detecting means is set to such a large value that vibrations in a lower frequency region such as camera shake are detectable. As a consequence, the control can smoothly shift to image stabilizing control without losing sight of the observation object.

What is claimed is:

1. An image stabilizing apparatus mounted in an optical apparatus having a monocular or binocular optical system in which an erect prism is disposed between an objective lens and an eyepiece, whereas said objective lens and eyepiece of said optical system are secured within a case;

said image stabilizing apparatus comprising:

gimbal suspension means, adapted to pivotally attach said erect prism to said case, having two pivotal axes extending sidewise and vertical directions of said optical apparatus, respectively;

an actuator for pivoting said gimbal suspension means about said two pivotal axes;

two angular position detecting means for detecting respective angular positions of said gimbal suspension means about said two pivotal axes;

two angular velocity detecting means, secured to said gimbal suspension means, for detecting respective angular velocities of said gimbal suspension means about said two pivotal axes;

feedback control means for driving said actuator, according to an angular position and angular velocity detected by said angular position detecting means and angular velocity detecting means, so as to fix said erect prism with respect to an inertial system and controlling said pivoting of said gimbal suspension means; and gain enhancing means for enhancing a gain of a feedback loop based on said angular position when said angular velocity is at a first set value or higher until said angular velocity becomes a second set value or lower.

2. An image stabilizing apparatus according to claim 1, further comprising gain switching means for enhancing said gain of feedback loop based on said angular position upon manual switching.

3. An image stabilizing apparatus according to claim 1, wherein said second set value is a value smaller than said first set value.

4. An image stabilizing apparatus according to claim 3, further comprising gain switching means for enhancing said gain of feedback loop based on said angular position upon manual switching.

* * * * *